United States Patent
Kassan

(10) Patent No.: US 7,225,148 B2
(45) Date of Patent: May 29, 2007

(54) E-COMMERCE SHOPPING CART

(76) Inventor: Peter Kassan, 16 Atilda Ave., Dobbs Ferry, NY (US) 10522

( * ) Notice: Subject to any disclaimer, the term of this patent is extended or adjusted under 35 U.S.C. 154(b) by 0 days.

(21) Appl. No.: 10/703,616

(22) Filed: Nov. 6, 2003

(65) Prior Publication Data

US 2005/0021417 A1 Jan. 27, 2005

Related U.S. Application Data

(60) Provisional application No. 60/505,080, filed on Sep. 22, 2003, provisional application No. 60/498,371, filed on Aug. 26, 2003, provisional application No. 60/490,127, filed on Jul. 25, 2003.

(51) Int. Cl.
*G06Q 30/00* (2006.01)

(52) U.S. Cl. .......................... 705/26; 705/27

(58) Field of Classification Search ............. 705/26–27
See application file for complete search history.

(56) References Cited

U.S. PATENT DOCUMENTS

| | | | |
|---|---|---|---|
| 6,601,057 | B1 | 7/2003 | Underwood et al. |
| 6,965,871 | B1 | 11/2005 | Szabo et al. |
| 2001/0053998 | A1* | 12/2001 | Kohda et al. .................. 705/14 |
| 2001/0056405 | A1 | 12/2001 | Muyres et al. |
| 2002/0055878 | A1 | 5/2002 | Burton et al. |
| 2002/0062245 | A1* | 5/2002 | Niu et al. ..................... 705/14 |
| 2002/0077929 | A1 | 6/2002 | Knorr et al. |
| 2002/0128925 | A1 | 9/2002 | Angeles |
| 2002/0165732 | A1 | 11/2002 | Ezzeddine et al. |
| 2002/0186255 | A1 | 12/2002 | Shafron et al. |
| 2003/0053615 | A1 | 3/2003 | Anderson et al. |
| 2003/0065577 | A1 | 4/2003 | Haynes et al. |
| 2003/0140140 | A1 | 7/2003 | Lahtinen |
| 2003/0144925 | A1* | 7/2003 | Greenberg .................... 705/27 |
| 2003/0158816 | A1 | 8/2003 | Rouse |
| 2004/0098747 | A1* | 5/2004 | Kay et al. ..................... 725/95 |
| 2005/0120221 | A1 | 6/2005 | Arnold et al. |
| 2005/0165616 | A1 | 7/2005 | Ellis et al. |

OTHER PUBLICATIONS

Cotlier, Moira; "Adieu to Abandoned Carts," Catalog Age, Oct. 2001, v18n11p. 39, 3 pgs, Proquest #82802316.*

YOUResponse: Internet Archive Wayback Machine, www.archive.org; www.youresponse.com; Feb. 21, 2001, Apr. 1, 2001, 8pgs.*

YOUResponse: "Businesses look to help in monitoring shopping cart abandonment; YOUResponse . . . to offer support," PR Newswire, Jan. 25, 2001, Proquest ID #67284048, 3pgs.*

(Continued)

*Primary Examiner*—Robert M. Pond
(74) *Attorney, Agent, or Firm*—Dickstein, Shapiro, LLP.

(57) ABSTRACT

A system and method is provided for monitoring the keystroke and mouse-click actions of a visitor to an e-commerce web site. After receiving a signal that represents an attempt to terminate the on-line session between a visitor and the e-commerce web site, and an e-commerce shopping cart contains at least one good or service, or if the shopping has items removed from it, or even if the shopping cart is empty, the visitor is prompted to respond to one or more prompts in a display screen.

44 Claims, 13 Drawing Sheets

OTHER PUBLICATIONS

Maravilla, "The Case of the Abandoned Shopping Carts," PowerHomeBiz.com, vol. 13, pp. 1-3.
Kemp, et al., "Customer Still Doesn't Come First," Internet Week, Sep. 29, 2000, pp. 1-3.
Robinson, "The Customer Service Ticking Clock," CRM Daily, May 7, 2002, pp. 1-4.
"Abandoned Shopping Carts," support.salescart.com, p. 1.
Whitman, "Increase Sales and Avoid Abandoned Shopping Carts," Microsoft bCentral, pp. 1-3.
Bayan, "Prevent Online Purchase Failures," News Center, The Write Edge, Apr. 2000, pp. 1-4.
"Shopping Carts Litter Internet," Silicon Valley/San Jose Business Journal, Nov. 8, 2000, pp. 1-2.

* cited by examiner

| Featured Brands | Request a Catalog | Find a Store |

Password [    ]

Forget your Login info?

↓ Shopping Cart

0 Line item in your card

▲ Hide Item Summary

Qty. Item Summary
                Subtotal

Free Delivery on most orders over $50!

(Checkout) (View Cart Details)

↓ Favorite Items

Shopping made easier!

Save a list of the products you buy most with Favorite Items.

(Get More Information)

Office Supplies

- Batteries
- Binders & Binder Accessories
- Boards & Easels
- Briefcases & Travel
- Calendars & Planners
- Desk Organizers & Accessories
- Envelopes
- Filing Supplies
- Forms
- Ink & Toner Finder
- Janitorial & Breakroom
- Labels
- Mail & Ship
- Pads & Post-it® Notes
- Paper
- Presentation & Meeting Supplies
- Rubberbands, Clips &Tacks
- Safes, Signs & Cash Handling
- Scissors, Rulers & Trimmers
- Staplers & Paper Punches
- Storage & Organization
- Tape, Glue & Adhesives
- Teaching & Educational Tools
- Writing Supplies

Furniture

- Armoires
- Bookcases
- Carts & Stands
- Chairmats
- Chairs
- Computer Workcenters
- Desks
- Furniture Rental
- Lighting
- Modular Workcenters
- Office Accessories
- Panel Systems
- Shelving
- Storage Cabinets

*FIG. 1*
PRIOR ART

| Featured Brands | Request a Catalog | Find a Store | | Password |
|---|---|---|---|---|

Office Supplies/Tape, Glue & Adhesives/
Tape Dispensers

Forget your Login info?

[ Shopping Cart ]
↓
0 Line item in your card

▲ Hide Item Summary
Qty. Item Summary
　　　　　　Subtotal

Free Delivery on most orders over $50!

( Checkout )　( View Cart Details )

[← Favorite Items]

Shopping made easier!

Save a list of the products you buy most with Favorite Items.

( Get More Information )

( Show Images )　　　　　Page [1 2 3] [ Next ▶ ]

| Item | Price | Unit |
|---|---|---|
| 3M Pop-Up Tape Mountable Dispenser | as low as $2.69 | Each |
| Scotch Deluxe Tape Dispenser with 6 Rolls of 810 Magic Tape | as low as $12.99 | Each |
| Scotch Designer Tape Dispenser | as low as $10.99 | Each |
| Scotch Designer Tape Dispenser With 10 Rolls of Tape | as low as $19.99 | Each |
| Scotch Pop-Up™ Tape & Dispensers | as low as $3.14 | 3/Pack |
| Scotch Tape Dispenser | as low as $7.79 | Each |

*!! YOU HAVE TERMINATED YOUR*
*ON-LINE SESSION WITH OUR STORE !!*

YOU HAVE NOT COMPLETED A
SALES TRANSACTION

Click Here! If You Wish to Continue Shopping

Click Here! If You Wish to Respond to Our Brief
Questionnaire

FIG. 9A

Shopping Cart
2 Line items in your cart

Qty. Item Summary
  3 Scotch Designer Ta...
  5 Scotch 600 Transpa..
    Subtotal: $81.42

Checkout    View Cart Details

ELECTRONIC QUESTIONNAIRE

ACCURATELY FILL IN THIS FORM AND RECEIVE AN E-COUPON REDEEMABLE FOR VALUE

PLEASE ENTER YOUR E-MAIL ADDRESS?

PLEASE DESCRIBE YOUR ON-LINE SHOPPING EXPERIENCE:

WHY ARE YOU CANCELING YOUR SHOPPING SESSION?

WOULD YOU LIKE THE ITEMS CURRENTLY IN YOUR SHOPPING CART TO BE STORED IN A WISH LIST? [YES]

☐ CHECK HERE TO REQUEST AN E-COUPON

[SUBMIT]

FIG. 9B

E-COMMERCE SHOPPING CART

CROSS-REFERENCE TO RELATED APPLICATIONS

The present invention is based on and claims priority to U.S. Provisional Patent Application Ser. No. 60/490,127, filed Jul. 25, 2003, 60/498,371, filed Aug. 26, 2003 and 60/505,080, filed Sep. 22, 2003 all entitled "IMPROVED E-COMMERCE SHOPPING CART," the entire contents of all of which are incorporated by reference.

FIELD OF THE INVENTION

The present invention relates to Internet e-commerce web sites, and, more particularly, to ensuring that a visitor to an e-commerce web site completes a sales transaction.

BACKGROUND OF THE INVENTION

The proliferation of Internet web sites has enabled users to locate and access commercial "e-commerce" web sites that offer the sale of goods and/or services directly over the World Wide Web. In a typical "e-commerce" Internet web site, a plurality of hyperlinks are formatted as text and/or graphic controls (e.g., buttons, drop-down lists, check boxes, text boxes, and the like) and represent goods and/or services offered for sale by the site's proprietor.

Ideally, search engines provide a relatively level playing field for e-commerce merchants to compete and sell their goods and services. It is no longer inconceivable for a small business owner that sells a particular good to compete with a massive department store chain located in a different geographic region and that provides the same or similar good for sale. The ability of a plurality of parties to compete effectively over the Internet has driven the development of e-commerce software applications, such as well known e-commerce shopping cart applications that enable visitors of a web site to select specific items for sale and, thereafter, to purchase those items through on-line purchasing functionality.

Referring to the drawing figures in which like reference numerals refer to like elements, there is shown in FIGS. 1-7 a series of display screens representing a typical prior art e-commerce web site. In the examples shown in FIGS. 1-7, the web site offers a plurality of items for sale and generally arranged by category. The example prior art e-commerce web site shown in FIGS. 1-7 is representative of a web site for STAPLES department store.

As shown in FIG. 1, a series of general category hyperlinks directed to office supplies and furniture is provided. For example, below the category, Office Supplies, is a plurality of hyperlinks for batteries, binders and binder accessories, boards and easels, etc. FIG. 2 shows a display screen that represents results presented to a visitor of the web site after the hyperlink for Tape, Glue and Adhesives (FIG. 1) is selected. As shown in FIG. 2, more particular categories of tape, glue and adhesives are provided, including glue & adhesive products, invisible tape, mounting & specialty tapes, and the like.

FIG. 3 shows an example display screen of a typical prior art e-commerce web site after a visitor selects the hyperlink for tape dispensers (FIG. 2). A plurality of specific items and respective prices is provided in the display screen shown in FIG. 3 for the visitor to select and purchase. In the example shown in FIG. 4, the visitor has selected SCOTCH DESIGNER TAPE DISPENSER. As shown in the upper right hand corner of FIG. 4, the visitor has not selected any items for purchase, and, therefore, the shopping cart summary 10 is listed as empty. Also shown in FIG. 4, the visitor has entered three for the quantity of tape dispensers for purchase in the quantity text box 12.

FIG. 5 shows the same e-commerce web site display screen as shown in FIG. 4, but differs in that the shopping cart summary 10 indicates the visitor has selected three SCOTCH DESIGNER TAPE DISPENSERS.

FIG. 6 shows another product, SCOTCH TRANSPARENT TAPE, that has been selected by the visitor for purchase. In the example shown in FIG. 6, the visitor has entered a quantity of five for purchase, shown in quantity text box 12. Once the visitor selects add-to-cart button 14, the e-commerce site updates the visitor's e-commerce shopping cart with the newly added items, substantially as shown in the shopping cart summary 10, in FIG. 7.

Continuing with reference to FIG. 7, the visitor has several choices available to him. For example, the visitor can select checkout button 16, which typically provides a display screen that prompts the visitor to submit credit card or other payment information to complete the transaction. After the transaction is completed, then the goods (or services) are delivered in accordance with shipping arrangements provided in the e-commerce web site. Alternatively, the visitor can continue shopping and select more items to be entered into the e-commerce shopping cart. Also, the visitor can amend the contents of the e-commerce shopping cart by removing items that are provided therein, or by changing quantities of items in the shopping cart.

A shortcoming in the prior art exists because a visitor of an e-commerce web site is able to terminate the on-line session with the site, for example, by closing the web browser application. In most Windows-based web browser software applications, the visitor can click the X button in the top right portion of the windowed screen. Alternatively, the visitor can select File from a menu, and then select Exit from the File sub-menu. Moreover, a user of Windows-based web browser software can effectively terminate on-line session with an e-commerce web site by pressing the ALT key and F4 key simultaneously, or by pressing the CTRL key and the F4 key simultaneously. Further, a user can click a mouse button over an icon representation in the WINDOWS TASKBAR and select the choice, Close, from the respective menu. Still another method to terminate an on-line session includes navigating and/or "surfing" to another web site. For example, a visitor can type a URL for a different web site in a browser address bar and be presented with a different web site, thereby terminating the communication session with the e-commerce web site. Alternatively, a hyperlink to another web site may be provided in the e-commerce web site, thereby enabling the visitor to terminate his session with the e-commerce web site and begin a new session with the web site identified in the hyperlink.

Thus, there are many ways for an on-line shopping session to terminate prior to the completion of a sales transaction.

After goods or services have been selected and added to an e-commerce shopping cart, and the visitor terminates the on-line session with the e-commerce web site, the visitor might never return to the merchant's e-commerce web site again. This presents a drawback for on-line merchants in that revenue is not realized. In typical prior art e-commerce web sites, the merchant maintains a record of the contents added to the e-commerce shopping cart, and the next time the visitor establishes an on-line session with, and logs in to, the merchant's web site, the contents are presented again to the visitor.

On some e-commerce web sites, the contents of the shopping cart are saved and on other sites they never are. Typically, if a user is not logged in to an e-commerce site, for example, by submitting a unique user name and password, the contents are never displayed. Information regarding shopping cart contents are not usually stored locally on a user's device, such as in Internet cookies, and, therefore, e-commerce web site server do not automatically populate an electronic shopping cart without the user being logged in.

SUMMARY OF THE INVENTION

It is desirable to provide a system and method whereby a visitor to an e-commerce web site is substantially automatically prompted to complete a sales transaction after goods or services have been added to an e-commerce shopping cart, and the visitor attempts to terminate the on-line session prior to completing the transaction (i.e., before paying for the goods and/or services).

It is further desirable to provide a system and method whereby a visitor to an e-commerce web site is substantially automatically prompted to respond to, and to electronically submit an electronic questionnaire in the event the visitor attempts to terminate a communication session with an e-commerce web site prior to completing a sales transaction, even if no items have been added to an e-commerce shopping cart.

It is still further desirable to provide a system and method whereby a visitor is provided a coupon or other certificate that is redeemable for goods, services or other value after responding to and submitting the above-described questionnaire.

In accordance with one embodiment of the present invention, a system and method is provided for monitoring whether a visitor is attempting to terminate an on-line session between a user operating a workstation and an e-commerce web site. In such a case, if an e-commerce shopping cart contains at least one good or service or if the shopping cart has items removed from it, or even if the shopping cart is empty, the visitor is prompted to respond to one or more prompts in a display screen.

In accordance with the present invention, the prompts in the display screen suggest the visitor continue shopping, terminate the session and empty the shopping cart, terminate the session and save the contents of the shopping cart, terminate the session and send out a reminder within a brief period of time to complete the transaction, or complete and submit a questionnaire.

BRIEF DESCRIPTION OF THE DRAWINGS

Figure 7:
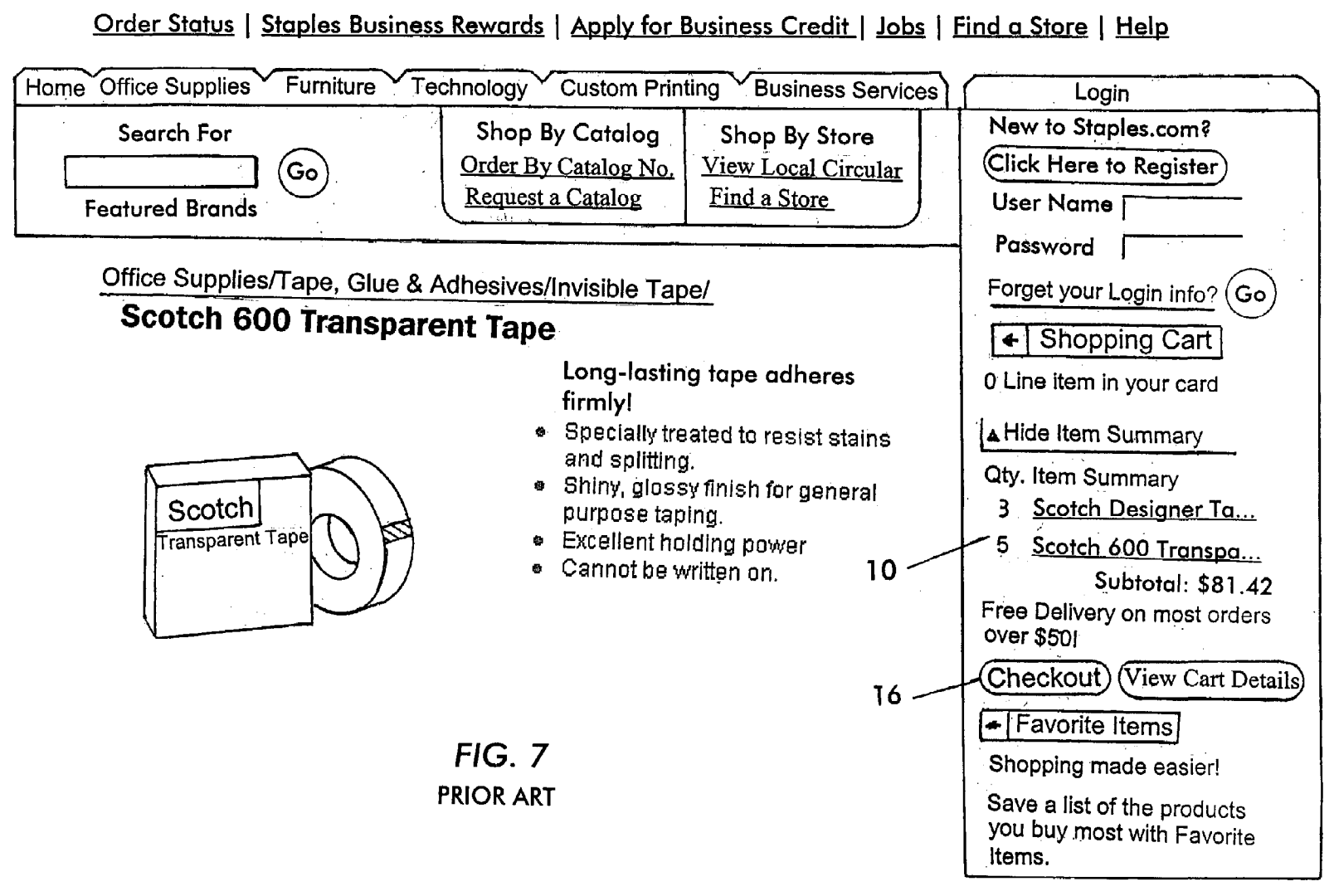

FIGS. 1-7 are examples of typical prior art e-commerce on-line web site display screens that are presented to a visitor during an on-line shopping session;

FIG. 9A is an example display screen that is provided to a visitor when an on-line session is terminated and the visitor has not completed a sales transaction;

FIG. 9B is an example questionnaire that is provided to a visitor who has agreed to respond to one or more questions directed to the visitor's on-line shopping experience.

DETAILED DESCRIPTION OF THE PREFERRED EMBODIMENTS OF THE INVENTION

As used herein, a "visitor" refers, generally, to a user operating a web-enabled user terminal and who has engaged in, is engaged in, or will engage in an "on-line" communication session (referred herein, generally, as a "visit"), typically via standard web browser software, with an HTTP server providing an e-commerce web site. Also as used herein, the term, "module," refers, generally, to one or more discrete components that contribute to the effectiveness of the present invention. Modules can include software elements, including but not limited to functions, algorithms, objects and the like. Modules can also include hardware elements, substantially for performing the steps or contributing to the performance of steps associated with the present invention. Modules can operate independently or, alternatively, can depend upon one or more other modules in order to function.

In accordance with the present invention, when a visitor visits an e-commerce web site by establishing an on-line session therewith, and thereafter desires to terminate the session, a subsequent display screen is preferably presented to the visitor. For example, new instances of browser "pop-up screens" can be programmed to be displayed when a visitor to an e-commerce (or other) web site attempts to terminate the on-line session therewith. Alternatively, a display screen is provided within the browser window that the visitor has attempted to close.

In an example embodiment, the present invention monitors a visitor's selections made during an on-line session with a merchant's e-commerce web site. For example, a visitor to an e-commerce web site navigates through one or more display screens to locate a particular item for sale. The visitor selects a graphic icon representing the item to indicate a desire to purchase the item. The item, thereafter, is placed in the e-commerce shopping cart. When a command is received from the visitor that will result in terminating the on-line session, for example, an attempt to close the web browser, the present invention preferably determines whether the e-commerce shopping cart contains any items. If, after determining the visitor will terminate the on-line session and the e-commerce shopping cart is not empty, the visitor is preferably prompted to respond to one or more prompts in a display screen.

Figure 2:
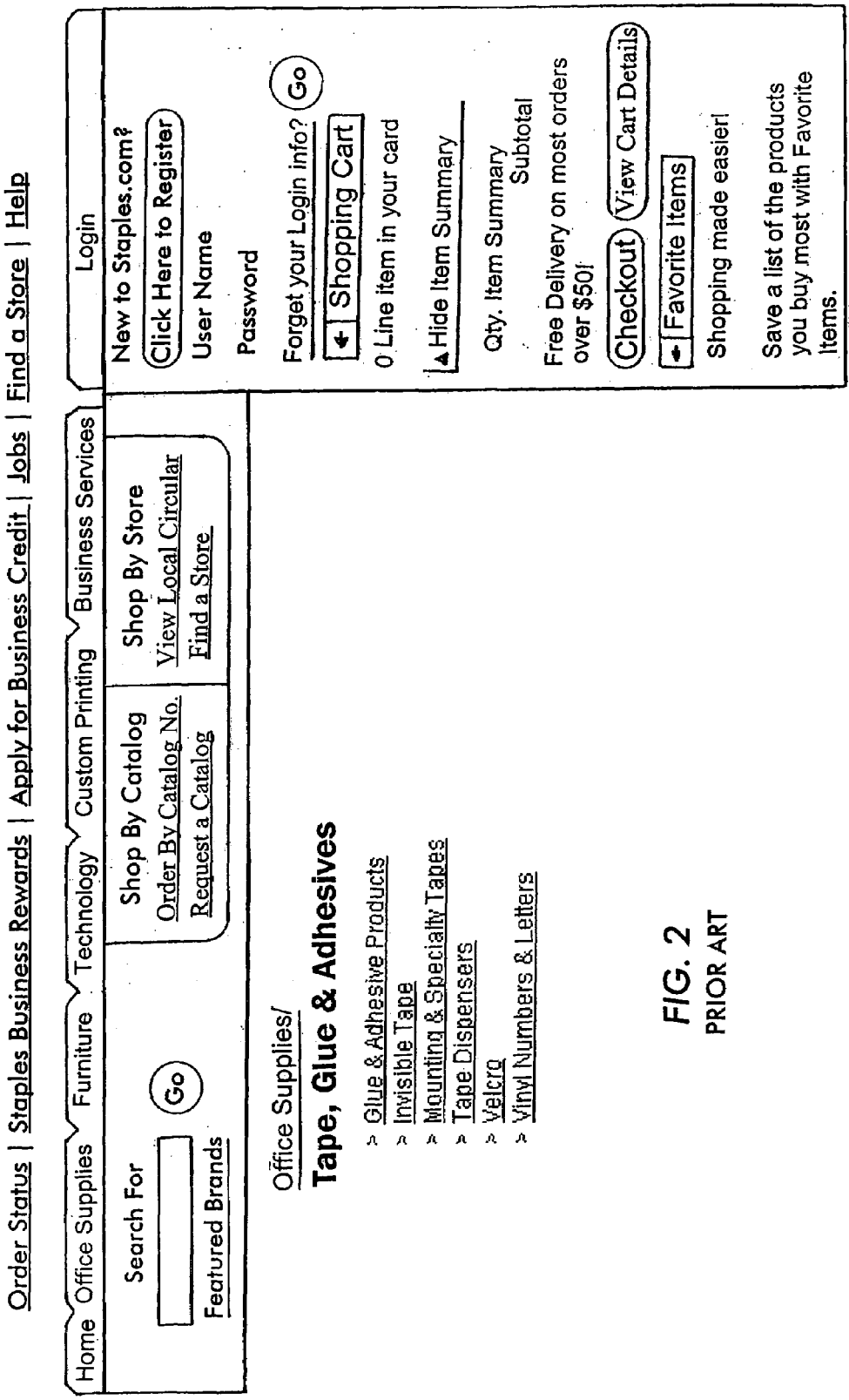
Figure 4:
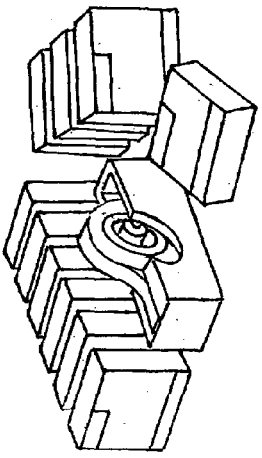
Figure 5:
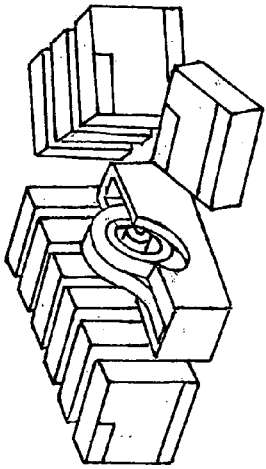
Figure 6:
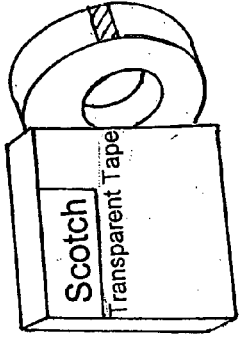
Figure 8:
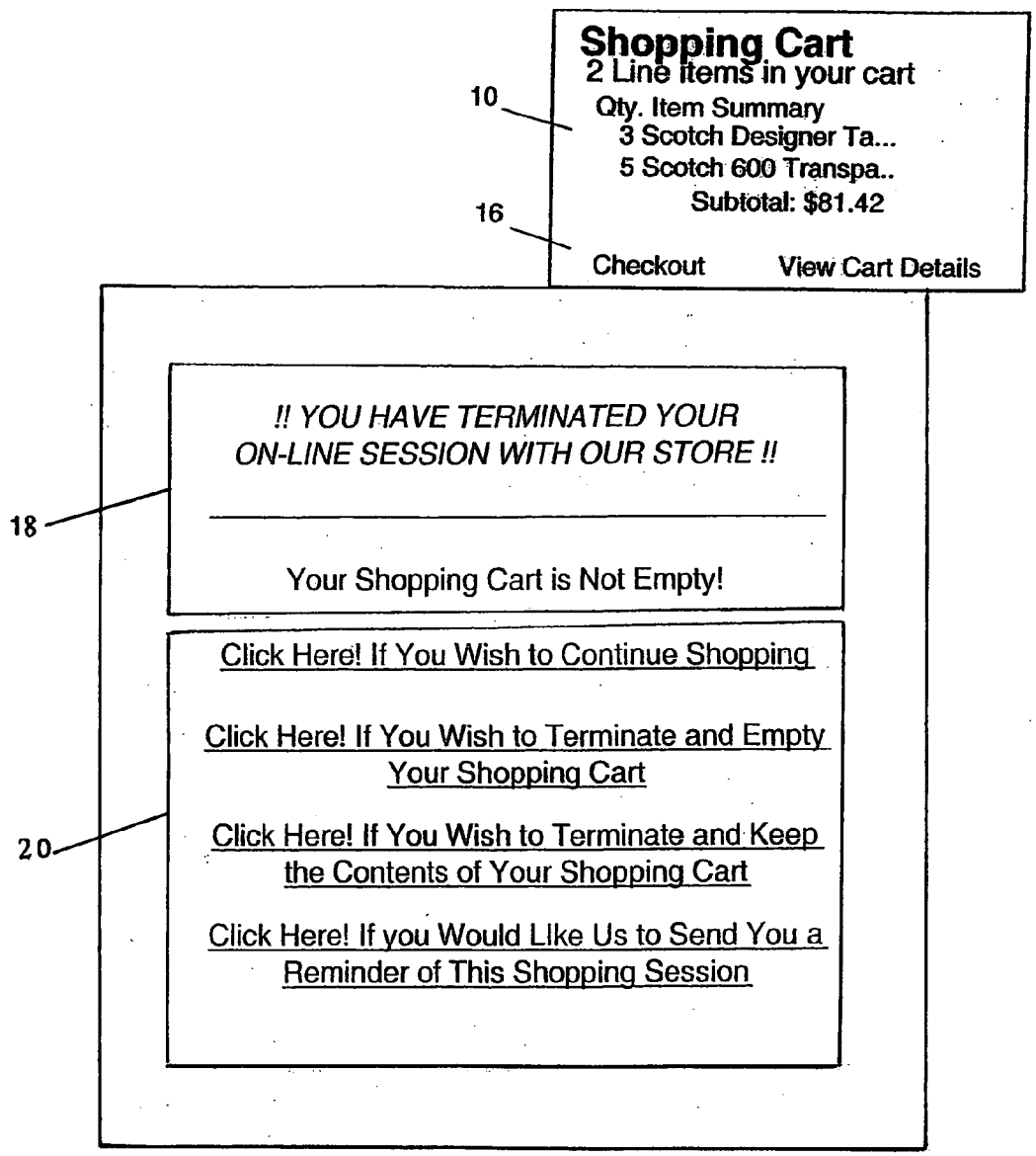
FIG. 8 is an example display screen that is provided to a visitor when an on-line session is terminated and the e-commerce shopping cart is not empty.

FIG. 8 shows an example display screen 17 that is provided to a visitor who has attempted to terminate an on-line session with an e-commerce web site after entering items in an e-commerce shopping cart. In the example shown in FIG. 8, an information title 18 is provided that indicates that the visitor has terminated the on-line session with a merchant's web site, and that the e-commerce shopping cart is not empty. In prompts section 20 of display screen 17, the visitor is prompted to make a selection to indicate whether the visitor wishes to continue shopping, terminate and empty the shopping cart, terminate and keep the contents of the shopping cart in the records of the merchant's on-line e-commerce web site, or whether the visitor would like a reminder, such as an e-mail or telephone call, to be sent in an effort to complete the transaction. In the example shown in FIG. 8, shopping cart summary 10 is provided along with checkout button 16 within the display screen 17, thereby enabling the visitor to easily complete his transaction. Alternatively, the shopping cart summary 10 is not provided, and the user completes his transaction by, for example, selecting the prompt to continue shopping.

In an example embodiment of the present invention, display screen 17 is preferably provided such that the visitor makes a selection from the series of prompts in prompt section 20 to ensure that the merchant is informed of the visitor's intentions. In this way, the present invention reduces the likelihood that visitors will abandon e-commerce shopping carts prior to completing sales transactions. Of course, one skilled in the art will recognize that many other prompts can be provided in display screen 17.

The features of the present invention also provide increased efficiency for visitors who inadvertently terminate on-line sessions with e-commerce web sites, and also provide increased efficiency for retailers who would like an on-line shopping session to result in a completed transaction. By monitoring the activities of visitors to an e-commerce web site, the present invention increases the likelihood that sales transactions will be followed through to completion.

Although the present invention has been described in terms of responding to a user event (i.e., terminating an on-line session) when an e-commerce shopping cart is not empty, the invention is not so limited. For example, in the event a visitor to an e-commerce web site attempts to terminate an on-line session with an e-commerce site, even when no items have been placed in the e-commerce shopping cart, a notification is provided to the visitor. The visitor's actions with respect to the communication session between the visitor and the e-commerce site are preferably monitored. If the visitor attempts to terminate the communication session with the e-commerce site (for example, by one of the methods described above), the act of terminating the session is preferably prevented, and special action is taken. For example, a message is presented to the visitor. Even if no items are added to an e-commerce shopping cart, or the visitor emptied the contents of an e-commerce shopping cart, a message is substantially automatically provided to the visitor.

In an example embodiment of the present invention, the above-identified message provided to the visitor is directed to information gathering. FIG. 9A shows an example display screen that appears to a visitor who attempts to terminate an on-line session with an e-commerce web site, regardless of the contents of the e-commerce shopping cart, without completing a sales transaction. In the example shown in FIG. 9A, the visitor is prompted to either continue shopping, or to respond to a brief questionnaire.

After a visitor selects the prompt to respond to the questionnaire (FIG. 9A), then, substantially as shown in FIG. 9B, an on-line questionnaire 22, formatted as a data entry form or other known interface for receiving information, is preferably provided to the visitor. For example, the visitor is prompted to submit responses to one or more prompts 24 that are directed to the visitor's shopping experience. For example, and as shown in FIG. 9B, the visitor may be asked to identify why he is terminating the on-line session without completing a sales transaction, why he removed contents from an e-commerce shopping cart, what the visitor's shopping preferences are, or the like. Effectively, any information that is desired by on-line merchants can be requested from the visitor. Also, the questionnaire can include asking the visitor if he would like to place the items added to an e-commerce shopping cart in a "wish list" for future purchase. The visitor can be notified at some future date, for example, by e-mail, to complete the sales transaction.

In an effort to encourage visitors who attempt to terminate on-line sessions with e-commerce web sites without completing sales transactions to provide information, incentives, such as coupons or gift certificates or other items of value, are preferably offered to the visitors. Such coupons or other items may be redeemable at the on-line merchant's e-commerce web site, or may be redeemable elsewhere. By providing valuable incentives, on-line merchants are more likely to receive valuable responses to questions from the visitors. As shown in the example embodiment in FIG. 9B, checkbox 26 is provided to enable the visitor to request a coupon that is redeemable for value. After the visitor completes the form, he selects submit button 28 and the questionnaire is forwarded to the proprietor of the e-commerce web site, or some other authorized party. Preferably, the visitor is prompted to complete the sales transaction prior to requesting a coupon or other promotional offer. The present invention reduces the likelihood that an on-line shopping cart will be abandoned. Accordingly, visitors are preferably prompted to complete a sales transaction first, and then offered or provided promotional offers thereafter.

In one example embodiment of the present invention, after a visitor attempts to terminate an on-line session with an e-commerce web site without completing a sales transaction, the visitor is prompted to complete the sales transaction, and further to fill in on-line questionnaire 22. If the visitor chooses to decline, the visitor is then prompted to complete the sales transactions and/or fill in the on-line questionnaire in return for a coupon or other item of value. By prompting the visitor a second time, the visitor is more likely to comply and respond to the on-line questionnaire.

Many prior art e-commerce web sites enable visitors to empty the contents of an e-commerce shopping cart without any further interaction. In accordance with one embodiment of the present invention, if a visitor empties existing contents of an e-commerce shopping cart, then the visitor is preferably prompted to submit information, such as why the contents of the shopping cart were removed. For example, the user is prompted to complete the sales transaction, and then after the visitor agrees to respond to an electronic questionnaire (preferably after the sales transaction is complete), a question directed to the visitor emptying the e-commerce shopping cart is presented.

Although the present invention has been described in relation to particular embodiments thereof, many other variations and modifications and other uses are envisioned herein. For example, the way messages and prompts are provided to visitors of e-commerce web sites can take various forms. In one example, a separate display "window" is substantially automatically opened and the visitor is prompted in that separate display window. Such separate display windows may be modal (i.e., maintaining the focus over all other display windows and directing all user-input therein). Alternatively, a message may appear in an existing display window in order to prompt or notify the visitor. Still further, an audio or audio/video prompt can be provided to the visitor.

Some e-commerce sites currently provide other kinds of collections of items in which a visitor has expressed an interest other than those items placed in the e-commerce shopping cart. These include: collections meant only for the visitor himself or herself, usually referred to as a "wish list" (but occasionally labeled in other ways, such as "just browsing" or "just thinking"); collections meant for public viewing, usually referred to as a "gift registry" such as a "bridal registry" (but could be labeled in other ways, such as a "public wish list"); and collections meant to be emailed or used in some other way on behalf of another person. The latter example of collections, which often consist of a single item, may not have a common label, but the way this functionality is usually invoked is via a button or link with an accompanying label to the effect of "email this to a friend." In accordance with the present invention, in any one or combination of such collections, functionality is implemented as has been described for the shopping list, namely, that when the visitor reduces the quantity of an item to zero or otherwise removes the item from the list (without placing it into another list, such as moving it from the shopping cart to the wish list), a process is invoked, such as asking permission to ask questions as to why the visitor has done so.

Furthermore, regardless of the content displayed to visitors, e-commerce and other web sites have the capability to keep track of which items a visitor has viewed during the current session without adding them to any list. In accordance with the present invention, when the visitor tries to exit, the web site offers to put all such items into the visitor's wish list or other list for later reference. Optionally, the web site provides a list of all items that the visitor has viewed without providing any list, and the visitor decides which lists, if any, each item is to be put into.

When a visitor removes an item from the e-commerce shopping cart (e.g., by reducing the quantity to zero), the web site preferably offers, instead, to move the item to the wish list. Optionally, if the visitor declines, the web site prompts to ask permission to ask questions about this behavior.

Further, when a visitor removes an item from the e-commerce shopping cart by moving it to another list, the web site optionally refrains from asking permission to ask questions about this behavior, since it is presumably understandable behavior.

Moreover, when a visitor removes an item from the e-commerce shopping cart (by reducing the quantity or by other mechanism), the web site displays other, related items, such as similar items that are priced lower. Preferably, though, the visitor is prompted to complete the sales transaction prior to the web site displaying alternative items for sale. Optionally, the web site prompts for permission to do so first.

Also, when a visitor visits a web site and tries to exit without purchasing anything and without viewing any list that has any items in it (such as the visitor's wish list), if there are any lists that are not empty, the web site preferably displays that list with a message reminding the visitor of it. Optionally, the web site asks permission to do so first. Preferably, the web site prompts the visitor to complete the sales transaction, first.

If the visitor is maintaining multiple lists on the web site (for example, a wish list and a bridal registry) and tries to exit without viewing all lists that are not empty, the web site preferably displays any non-empty lists that the visitor has not visited during the current session. Optionally, if there is more than one such list, the web site simply displays a list of such lists, each of which is a link to the corresponding list itself. Optionally, the web site asks permission before displaying either the non-empty list or lists or the list of lists.

Figure 10:
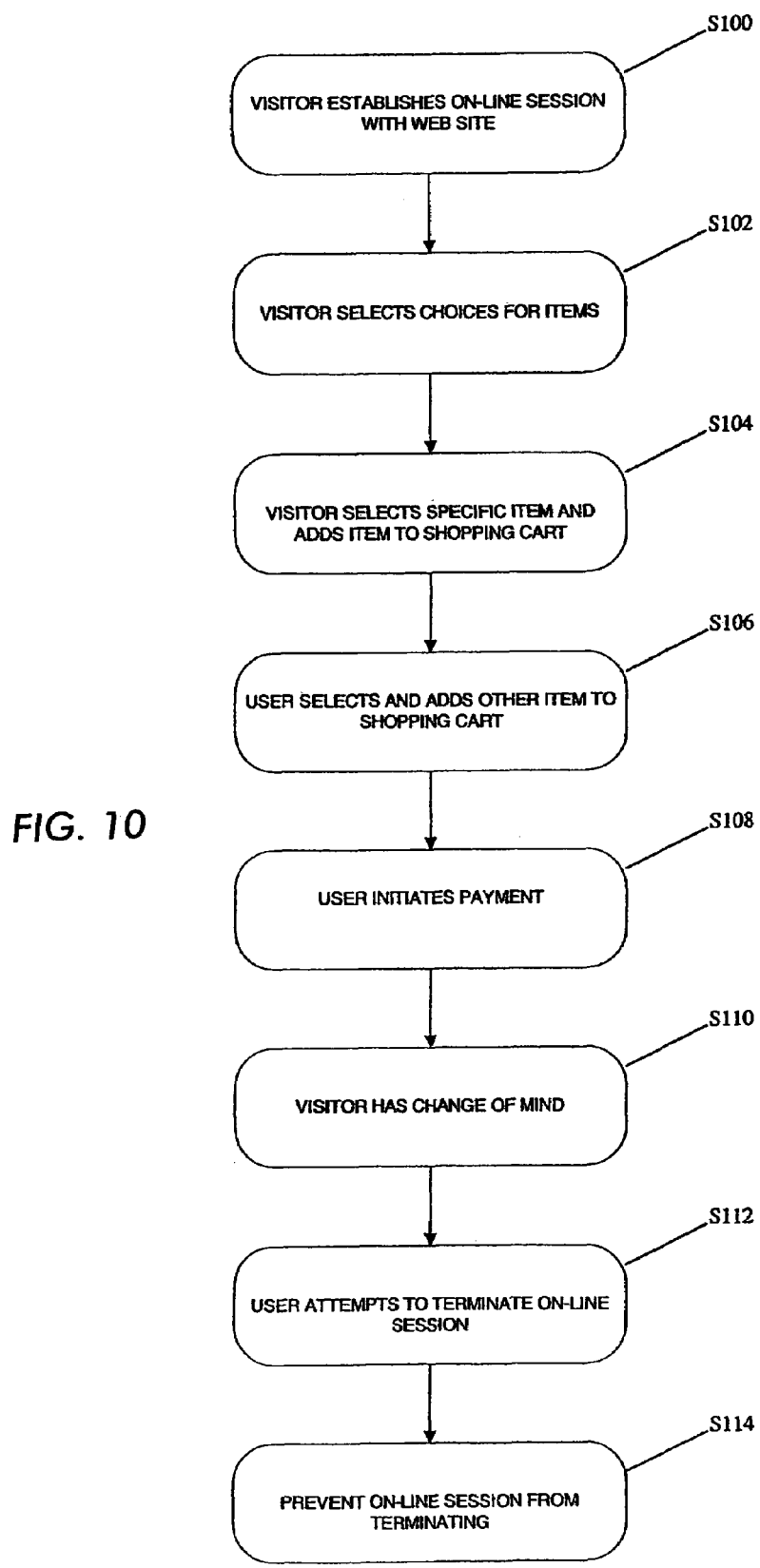
FIGS. 10-12 are flow charts the represent example steps associated with the present invention.
Figure 11:
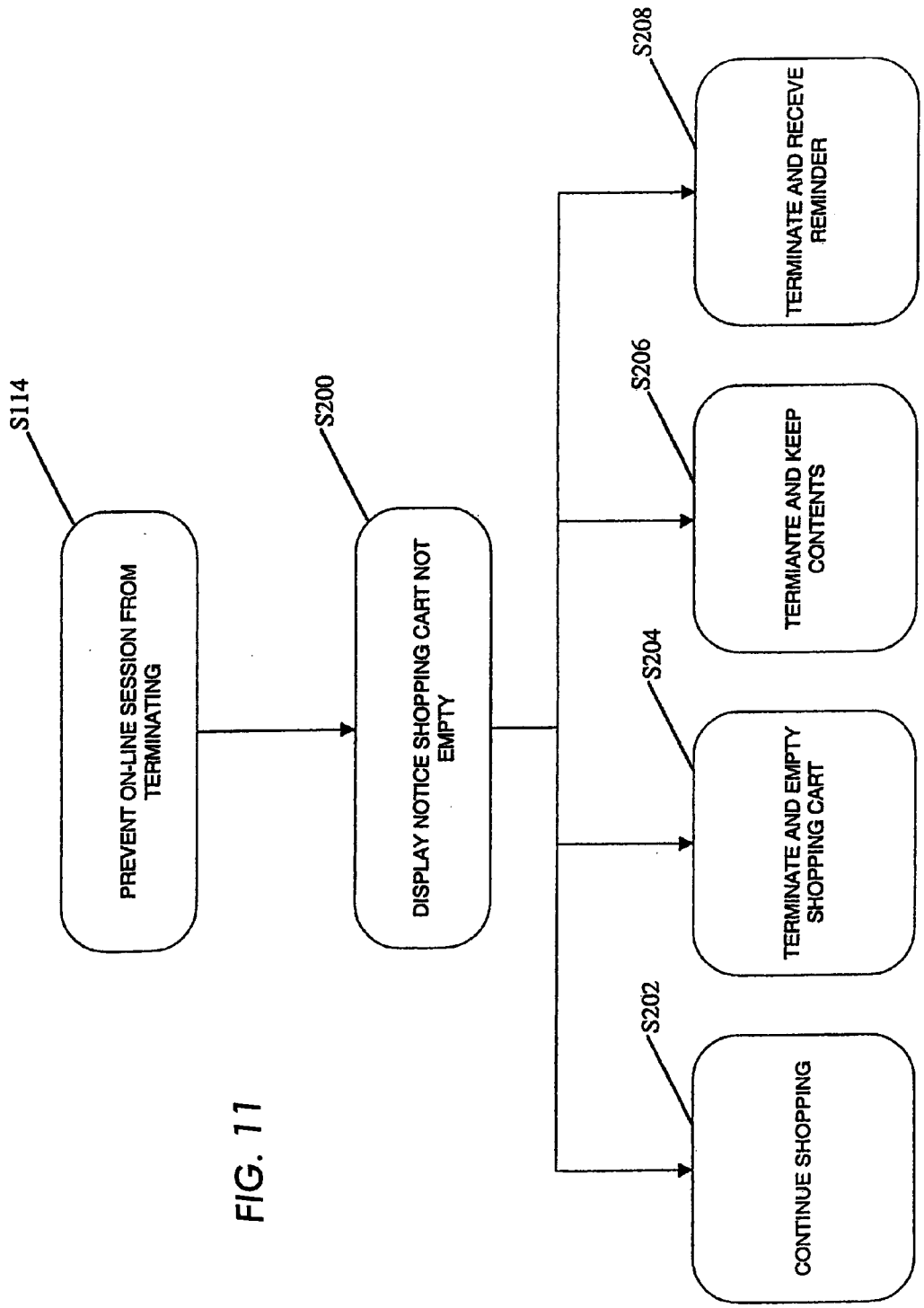
Figure 12:
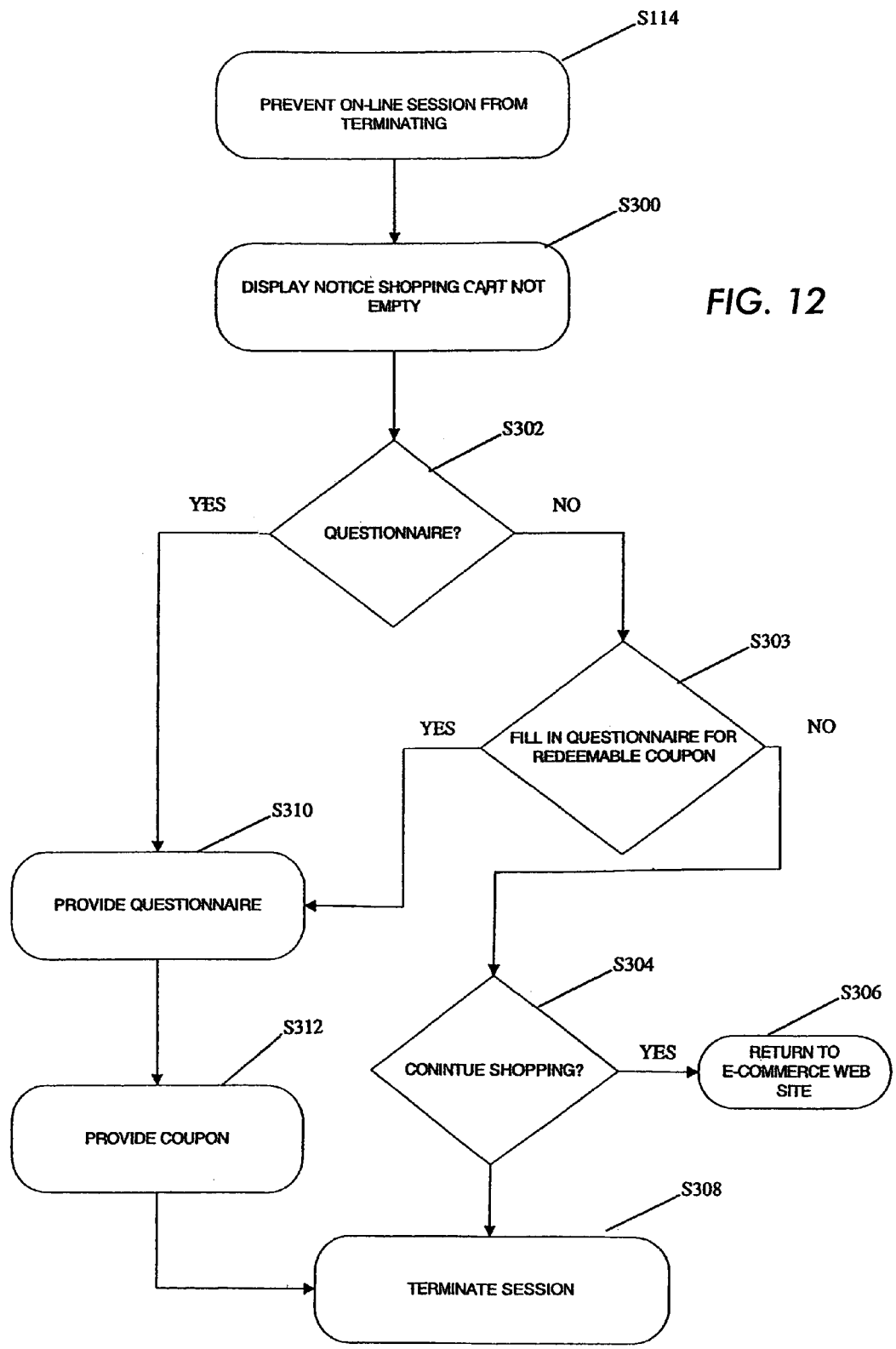

The present invention is now further described by way of example, and with reference to the flow charts depicted in FIGS. 10-12. The example flow charts shown in FIGS. 10-12 represent example embodiments of the present invention, it being understood that steps may be added, removed or changed without departing from the spirit of the present invention.

FIG. 10 shows an example flow chart that represents steps associated with e-commerce activity in accordance with the present invention. In step S100, a visitor establishes an on-line session with an e-commerce web site to shop for items, for example, electronics. The visitor makes selections within the web site that eventually results in a display screen showing a variety of electronic items (step S102). The visitor views several different models, and selects a hyperlink to a respective model that results in the model being added to an e-commerce shopping cart functioning within the e-commerce web site (step S104). While reviewing options provided on the e-commerce web site, the visitor decides to make another purchase and selects a hyperlink corresponding to another item which is added to the e-commerce shopping cart (step S106). The visitor elects to complete shopping, and selects a hyperlink for initiating payment for the items (step S108).

In step S110, the visitor has a change of mind after reviewing total costs for the items and decides not to purchase the items. The visitor decides to terminate the session with the e-commerce web site using any known method (step S112). In accordance with the present invention, the visitor is prevented from terminating the on-line session and one or more interactive messages are displayed (step S114).

FIGS. 11 and 12 illustrate example steps that occur in accordance with the present invention. Each of the flow charts provided in FIGS. 11-12 begins with step S114 (FIG. 10).

With reference to FIG. 11, a display screen is provided to the visitor that indicates the e-commerce shopping cart is not empty (step S200). In the display screen, hyperlinks are provided for the visitor to select whether the visitor wishes to continue shopping (step S202), terminate the on-line session and empty the shopping cart (step S204), terminate the on-line session and maintain the contents of the shopping cart for future use (step S206), or request future reminder notifications regarding the items to be sent to the visitor (step S208). By providing several choices, such as in steps S202-S208, a proprietor of an e-commerce web site has an increased likelihood of realizing a sale, while the visitor is still able to maintain a level of control over his on-line shopping experience.

With reference to FIG. 12, an alternative display screen is provided in step S300 to the visitor that indicates the visitor's e-commerce shopping cart is not empty. In step S302, the visitor is prompted to respond to an electronic questionnaire. If the visitor elects not to respond to the questionnaire, then, in step S303, the visitor is again prompted to respond to a questionnaire with the added incentive of a promise of an electronic coupon that is redeemable for value. If the visitor continues to elect not to respond to the questionnaire, then, in S304, the visitor is prompted to continue shopping and maintain the on-line session. The process branches to step S306 if the visitor elects to continue shopping, or, if not, the process branches to step S308 and the visitor's on-line session with the e-commerce web site is terminated. If, in step S302 or step S303, the visitor elects to respond to the questionnaire, then the process branches to step S310 and the electronic questionnaire is preferably provided for the visitor. In one example embodiment of the invention, an electronic coupon that is redeemable for value is provided to the visitor after the visitor responds to the questionnaire (step S312). Thereafter, the process branches to step S304, and the visitor is prompted to continue shopping.

Thus, the present invention provides solutions to shortcomings found in prior art e-commerce web sites. By providing a new layer of interaction with a visitor of an e-commerce web site, the likelihood of a sales transaction occurring on an e-commerce web site is significantly higher than that of prior art e-commerce web sites.

It is preferred that the present invention not be limited by the specific disclosure herein.

What is claimed is:

1. A control system for controlling an Internet-based on-line commercial transaction, the system comprising:
   a first computer system supporting a user terminal;
   a second computer system supporting an Internet website, wherein a communication session is established over a communication network between the Internet web site supported by the second computer system and the user terminal supported by the first computer system;
   a request receiving module that is structured to receive a request from the user terminal for at least one sellable offered for sale on the Internet web site;
   a shopping session module structured to set up and control a shopping session between the Internet web site and the user terminal that is established as part of the communication session and substantially when the request receiving module receives the request from the user terminal;
   a user event receiving module structured to receive a user termination event indication that indicates the user's attempt to terminate the shopping session prior to the user providing a commitment to purchase the at least one sellable; and
   a notification providing module structured to prevent the user from terminating the shopping session and to provide a notification in the shopping session to the user substantially immediately after the user termination event indication is received, and to refrain from providing the notification if the user has committed to purchase the at least one sellable, wherein the notification is formatted to prompt the user to maintain the shopping session and to purchase the at least one sellable,
   wherein the request receiving module, the shopping session module, the user event receiving module and the notification providing module are operable on at least one of the first or second computer systems.

2. The system of claim 1, wherein the notification providing module formats the notification to receive input from the user.

3. The system of claim 1, wherein the notification additionally includes a questionnaire.

4. The system of claim 3, wherein the questionnaire includes at least asking the user to comment about the user's experience of requesting the at least one sellable.

5. The system of claim 3, further comprising a coupon module that provides a coupon redeemable for value after the user responds to the questionnaire, wherein the coupon module is operable on at least one of the first or second computer systems.

6. The system of claim 5, wherein the coupon module formats the coupon as at least one of an alphanumeric code, a graphic, and a card.

7. The system of claim 1, wherein the notification module formats the notification to provide a prompt for the user to perform at least one of continue shopping, terminate the communication session and remove a record of the at least one sellable, terminate the communication session and maintain a record of the at least one sellable, and terminate the communication session and provide a request for a reminder to purchase the at least one sellable.

8. The system of claim 7, wherein the reminder is formatted as at least one of a pop-up screen, a portion of the web site, a telephone call, e-mail and physical mail.

9. The system of claim 1, wherein the notification providing module formats the notification as a display screen that does not include a control to close the display screen.

10. The system of claim 9, wherein the user event receiving module further determines when a user performs at least one of pressing a key and clicking a button on a pointing device.

11. The system of claim 10, wherein the pointing device is at least one of a trackball, a mouse, a trackpad, a touchscreen, a pointer and a stylus.

12. The system of claim 1, wherein the notification providing module provides the notification after a request is received for at least two sellables from the user and the user modifies the request to remove at least one of the at least two sellables.

13. The system of claim 1, wherein the user event receiving module further receives user modification event indication when the user modifies the request for at least one sellable by removing at least one sellable from the request, and providing the notification after receiving the user modification event indication.

14. The system of claim 1, wherein the notification providing module further formats the notification as a request that asks the user to respond to an electronic questionnaire, and further provides an electronic questionnaire when the user responds affirmatively to the notification.

15. The system of claim 1, wherein the user adds the request for at least two sellables to an e-commerce shopping cart.

16. The system of claim 1, wherein the notification providing module further provide a notification to the user before the user termination event indication is received, but after a representation of at least one sellable is removed from an e-commerce shopping cart.

17. The system of claim 1, wherein the notification providing module formats the notification to include representations of at least one other sellable that relates to the at least one sellable.

18. The system of claim 1, further comprising a database that stores a list of the at least one sellable in a database, wherein the database is supported on at least the second computer system.

19. The system of claim 18, further comprising a list display module that displays the list to the user after the user establishes another electronic communication session between the web site and the user terminal, wherein the list display module is operable on at least one of the first or second computer systems.

20. The system of claim 1, wherein notification providing module further displays the notification after the user adds a respective representation for each of the at least one sellable in an e-commerce shopping cart.

21. A method for controlling an Internet-based on-line commercial transaction, the method comprising:
   establishing an electronic communication session between a web site and a user terminal over a communication network;
   receiving a request for at least one sellable offered for sale on the Internet web site from the user terminal;

setting up and controlling establishing a shopping session between the Internet web site and the user terminal as part of the electronic communication session and substantially when the request is received;

receiving a termination event indicator that indicates the user attempting to terminate the shopping session and prior to the user providing a commitment to purchase the at least one sellable;

preventing the user from terminating the shopping session; and providing a notification to the user in the shopping session after the termination event indicator is received, wherein the notification is a prompt to purchase the at least one sellable, and refraining from providing the notification if the user has committed to purchase the at least one sellable.

22. The method of claim 21, wherein the notification is formatted to receive input from the user.

23. The method of claim 21, wherein the notification further includes an electronic questionnaire.

24. The method of claim 23, further comprising providing a coupon redeemable for value is provided after the user responds to the questionnaire.

25. The method of claim 24, wherein the coupon is formatted as at least one of an alphanumeric code, a graphic, and a card.

26. The method of claim 21, wherein the notification prompts the user to perform at least one of continue shopping, terminate the communication session and remove a record of the at least one sellable, terminate the communication session and maintain a record of the at least one sellable, and terminate the communication session and provide a request for a reminder to purchase the at least one sellable.

27. The method of claim 26, wherein the reminder is formatted as at least one of a pop-up screen, a displayed portion of the web site, a telephone call, e-mail and physical mail.

28. The method of claim 21, wherein the notification is formatted as a display screen that does not include a control to close the disptay screen.

29. The method of claim 28, wherein the step of receiving the signal includes determining when a user performs at least one of pressing a key and clicking a button on a pointing device.

30. The method of claim 29, wherein the pointing device is at least one of a trackball, a mouse, a trackpad, a touchscreen, a pointer and a stylus.

31. The method of claim 21, wherein the notification is provided after receiving a request for at least two sellables from the user and the user modifies the request to remove at least one of the at least two sellables.

32. The method of claim 31, wherein the questionnaire includes at least one of asking the user to comment about the user's experience of requesting the at least one sellable and asking the user to explain why the request was modified to remove at least one of the at least two sellables.

33. The method of claim 21, further comprising receiving another signal when the user modifies the request for at least one sellable by removing at least one sellable from the request, and providing the notification after receiving the another signal.

34. The method of claim 21, wherein the notification is formatted as a request that asks the user to respond to an electronic questionnaire, and further comprising providing an electronic questionnaire when the user responds affirmatively to the notification.

35. The method of claim 21, wherein the request for at least two sellables is presented in an e-commerce shopping cart.

36. The method of claim 21, further comprising providing a notification to the user before the signal is received, but after at least one sellable is removed from an e-commerce shopping cart.

37. The method of claim 21, wherein the notification includes displaying representations of at least one other sellable that relates to the at least one sellable.

38. The method of claim 21, further comprising storing a list of the at least one sellable in a database.

39. The method of claim 38, further comprising displaying the list to the user after the user establishes another electronic communication session between the web site and the user terminal.

40. The method of claim 21, further comprising displaying the notification after the user adds a respective representation for each of the at least one sellable in an e-commerce shopping cart.

41. The method of claim 21, further comprising moving the request for the at least one sellable to an e-commerce wish list.

42. The method of claim 21, further comprising a plurality of lists of sellables for a user, and displaying the plurality of lists to the user after the signal is received.

43. A control system for controlling an Internet-based on-line commercial transaction, the system comprising:

a first computer system supporting a user terminal;

a second computer system supporting an Internet website, wherein a communication session is established over a communication network between the Internet web site supported by the second computer system and the user terminal supported by the first computer system;

a request receiving module structured to receive a request from the user terminal for at least one sellable offered for sale on the Internet web site;

a shopping session module structured to set up and control a shopping session between the Internet web site and the user terminal that is established as part of the communication session and substantially when the request receiving module receives the request from the user terminal;

a user event receiving module structured to receive a user termination event indication that indicates the user's attempt to terminate the shopping session prior to the user providing a commitment to purchase the at least one sellable; and a notification providing module structured to prevent the user from terminating the shopping session and to provide a notification to the user in the shopping session substantially immediately after the user termination event indication is received, and to refrain from providing the notification if the user has committed to purchase the at least one sellable, wherein the notification is formatted to receive input from the user and to prompt the user to purchase the at least one sellable, wherein the request receiving module, the shopping session module, the user event receiving module and the notification providing module are operable on at least one of the first or second computer systems.

44. A method for controlling an Internet-based on-line commercial transaction, the method comprising:

establishing an electronic communication session between an Internet web site and a user terminal over a communication network;

receiving a request for at least one sellable offered for sale on the Internet web site from the user terminal;

setting up and controlling establishing a shopping session between the Internet web site and the user terminal as part of the electronic communication session and substantially when the request is received;

receiving a termination event indication that indicates the user is attempting to terminate the shopping session and prior to the user providing a commitment to purchase the at least one sellable;

preventing the user from terminating the shopping session; and providing a notification to the user in the shopping session after the termination event indication is received, and refraining from providing the notification if the user has committed to purchase the at least one sellable, wherein the notification is formatted to receive input from the user and prompts the user to purchase the at least one sellable.

* * * * *